United States Patent [19]

Martinez

[11] Patent Number: 4,984,871
[45] Date of Patent: Jan. 15, 1991

[54] OPTICAL REAR PROJECTION SCREEN HANGER ASSEMBLY

[76] Inventor: Eugene Martinez, Woodbine Rd., Irvington, N.Y. 10533

[21] Appl. No.: 447,428

[22] Filed: Dec. 7, 1989

[51] Int. Cl.$^5$ ............................................. G03B 21/56
[52] U.S. Cl. ...................................... 350/117; 52/281
[58] Field of Search ...................... 160/328, 349.1, 378, 160/380; 40/603, 605; 350/117, 123, 124; 52/474, 780, 281, 395

[56] References Cited

U.S. PATENT DOCUMENTS 4,254,600  3/1981  Zwissler ................................ 52/281

FOREIGN PATENT DOCUMENTS 1062764  12/1953  France .
510915    6/1955  Italy .

Primary Examiner—Richard A. Wintercorn
Attorney, Agent, or Firm—Darby & Darby

[57] ABSTRACT

A hanging device for hanging an optical rear projection screen comprising means for securing a top portion of the screen, means for non-rigidly restraining a bottom portion of the screen to allow expansion and contraction of the screen, and means for adjusting the screen in a lateral or longitudinal direction. The securing means comprises a pair of upper brackets, compression strips and a fastening element and the restraining means comprises a pair of lower brackets and compression strips to sandwich the screen therebetween. Means for holding and separating contiguously mounted optical rear projection screens may be provided wherein the means comprises a vertical support having an outer and inner longitudinally extending channel formed on opposing surfaces. Means for joining a front lenticular lens piece to a rear fresnel piece of a two piece optical rear projection screen are also provided. The joining means comprises means for hanging a top portion of the rear surface of the front piece from a top portion of the rear surface of the rear piece to allow the weight of the front piece to hold it flat against the rear piece. The hanging means prevents downward sliding of the front piece.

21 Claims, 5 Drawing Sheets

OPTICAL REAR PROJECTION SCREEN HANGER ASSEMBLY

BACKGROUND OF THE INVENTION

1. Field of the Invention

The present invention relates to a device for mounting an optical rear projection screen and for holding two parts of an optical rear projection screen together.

2. Background of the Invention

There are two ways of showing images on a screen. The most common way is front projection such as in a movie theatre. The second way is rear projection such as in a microfilm reader in a public library. The advantage of rear projection is that it permits the showing of projected images in a room with a fairly high level of ambient illumination, such as a workplace or a conference room. With the advent of electronic imaging sources (video projectors) and their seemingly endless access to different types of information, there is an increasing demand for large rear projection screen facilities.

Until recently, rear projection screens were simple affairs that consisted of a substrate material that was usually a clear glass or acrylic sheet with one surface painted using a translucent pigment, the coated surface becoming the image forming surface for a picture projected on the screen. The techniques used for installing these rear projection screens were the same as the techniques used to install a display window in a store. With the advent of video projectors, an entirely new type of screen had to be developed because the old rear projection diffusion type screen would not function properly in this mode.

These new screens are called optical rear projection screens. They are generally two types of these screens: (a) a one piece screen consisting of two elements (fresnel lens and lenticular lens) or (b) a two piece screen consisting of three elements (fresnel lens, gathering lens and lenticular lens). In either case, the screen comprises more than one lens. These screens require new mounting techniques to satisfy the dimensional accuracy made necessary by the need for precise optical alignment of all the elements. Also, these new optical screens are made of a cast acrylic and are very lightweight compared to their glass predecessors. Therefore, since acrylic is sensitive to temperature and humidity changes, the manner of mounting the screen must accommodate the movement of the screen resulting from these properties.

Prior methods of mounting the screens did not satisfactorily allow for alignment adjustment of the screen to the projector. Additionally, these methods caused unnecessary strains and stresses on the screen which caused cracks in the screen. This has created a need for a new way to hang these optical screens which takes into account their special needs and characteristics.

Additionally, prior methods of holding two piece screens together have been unsuccessful since the screens were susceptible to misalignment and separation which caused the image to appear out of focus in the areas of the screen where the two pieces had separated from each other. This is particularly disadvantageous when computer text is displayed on the screen.

For example, the prior methods of holding the two pieces of the screen together required taping the pieces together along the four edges. However this method was unsuccessful since the screens separated. The front piece (the lenticular lens portion of the screen), which faces the audience, it is generally much thinner and more flexible than the back piece (the fresnel lens portion), which faces the projector. When the two pieces are cut to size, the front piece is generally made one or two millimeters shorter than the back piece. The front piece is also more flexible than the back piece, and therefore when the two pieces are taped together, it is assumed that the shorter front piece will be held against the face of the back piece. However, in the prior methods this does not happen, and the front slips down slightly to rest along its bottom edge and thereby buckles of its own weight, causing undesired separation between the two surfaces. The need exists for a way to mount the two pieces of the screen together which will prevent such slippage, buckling and subsequent separation.

SUMMARY OF THE INVENTION

The present invention overcomes the aforementioned and problems and deficiencies in the art. The present invention provides a hanging device for hanging an optical rear projection screen comprising means for rigidly securing a top portion of the screen to a support through a resilient member, means for non-rigidly restraining a bottom portion of the screen to allow expansion and contraction of the screen, and means for adjusting the screen in a lateral or longitudinal direction. The securing means may comprise a pair of upper brackets, a compressible strip, and a fastening element and the restraining means may comprise a pair of lower brackets to sandwich the screen therebetween.

Means for holding and separating contiguously mounted optical rear projection screens may be provided wherein the means comprises a vertical support having an outer and inner longitudinally extending channel formed on opposing surfaces.

The present invention also comprises means for joining a front lenticular lens piece to a rear fresnel lens piece of a two piece optical rear projection screen. The joining means comprises means for hanging a top portion of the rear surface of the front piece from a top portion of the front surface of the rear piece to allow the weight of the front piece to hold it flat against the rear piece. The hanging means prevents downward sliding of the front piece.

BRIEF DESCRIPTION OF THE DRAWINGS

Various objects, features and attendant advantages of the present invention would be more fully appreciated as the same becomes better understood from the following detailed description of the preferred embodiments of the present invention when considered in connection with the accompanying drawings, in which.

DETAILED DESCRIPTION OF THE PREFERRED EMBODIMENTS

Figure 1A:
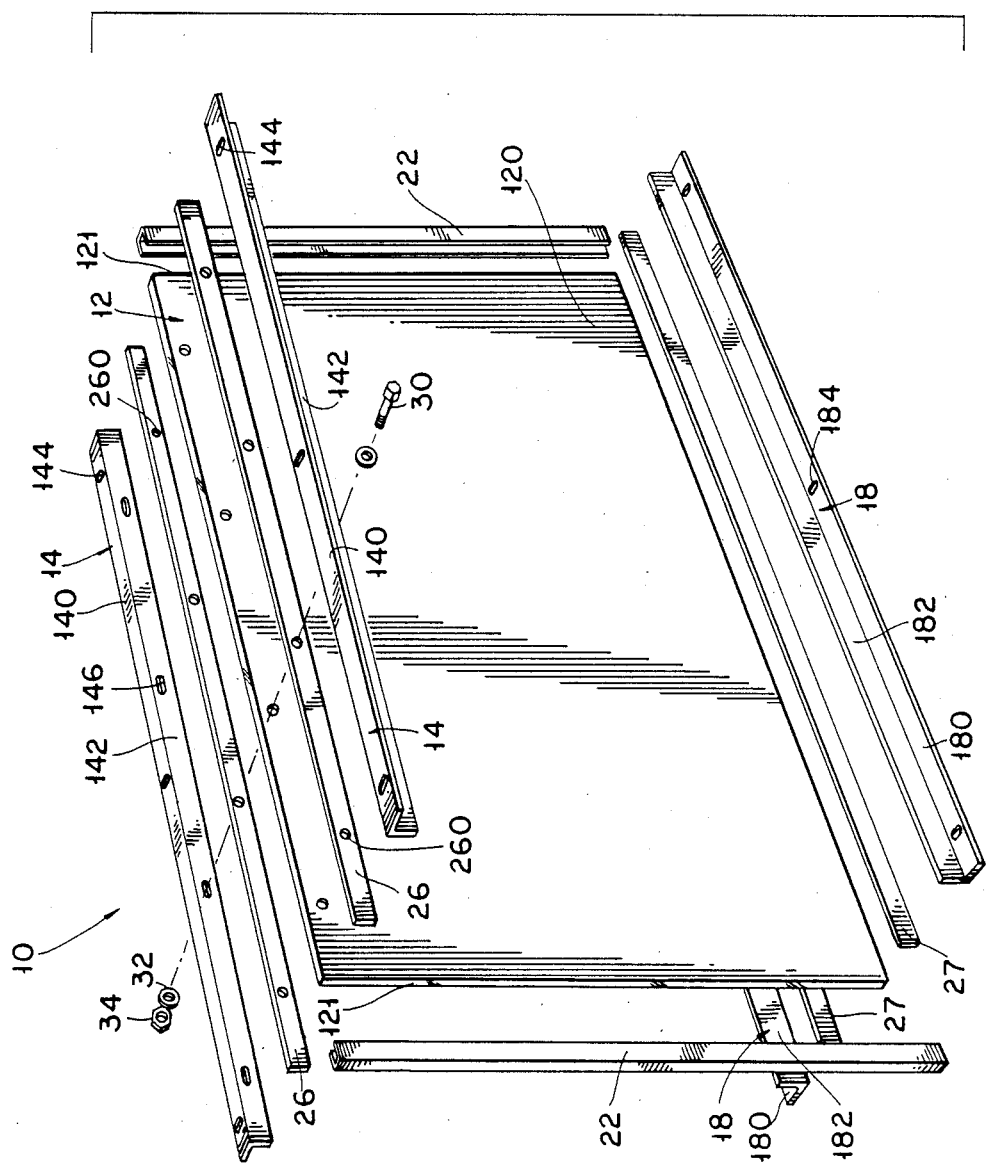
FIG. 1A is an front perspective exploded view of the frame assembly of the present invention for hanging an optical rear projection screen.
Figure 2:
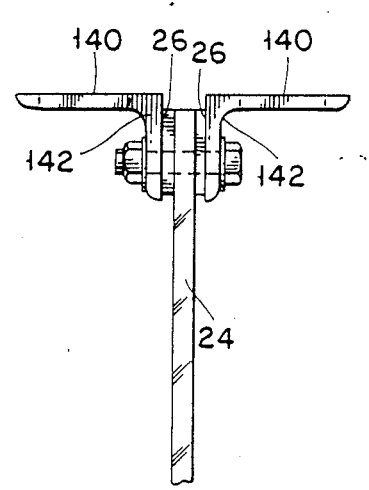
FIG. 2 is a view of a top portion of the frame assembly of the present invention shown assembled.
Figure 3:
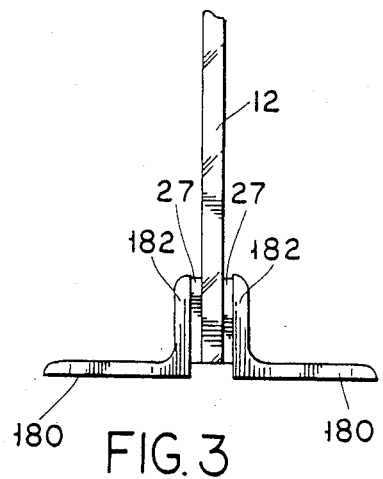
FIG. 3 is a side view of a bottom portion of the frame assembly of the present invention shown assembled.

In the drawings, like reference numerals represent identical or corresponding parts throughout the several views, FIGS. 1-3 show the frame assembly 10 of the present invention which is used to hang an optical rear projection screen 12. The frame comprises a pair of top brackets 14, a pair of bottom brackets 18 and a pair of vertical side supports 22. More specifically, the top brackets 14 are disposed on opposing sides of a top portion of screen 12 and the bottom brackets 18 are disposed on opposing sides of a bottom portion of screen 12. Vertical supports 22 are disposed over the right and left edges of the screen, respectively.

Turning first to the top or upper brackets 14 of the present invention, the brackets 14 are identical in configuration, the only difference being in the way they are positioned to support the screen which will be described in more detail below. Each top bracket 14 is L-shaped in configuration and has a top wall 140 and a perpendicularly extending vertical wall 142. A plurality of longitudinally spaced laterally extending upper slots 144 are formed in top wall 140 and a plurality of longitudinally extending side slots 146 are formed in vertical wall 142.

Top compression or resilient strips 26, composed of a soft spongy resilient material, are interposed between a top portion of screen 12 and vertical wall 142 of top angle bracket 14. A plurality of holes 260 are spaced apart along the length of each compression strip 26. Compression strips 26 provide an even gripping area along the entire width of the screen and accommodate changes in the lenses due to temperature variations and the like.

Bottom or lower brackets 18 are similar in configuration, the only difference being in their orientation with respect to screen 12. Each bottom bracket is L-shaped, having a bottom wall 180 and a perpendicularly extending side wall 182. A plurality of laterally extending bottom slots 184 are formed in bottom wall 180. Unlike top brackets 14, bottom brackets 18 do not have slots in their vertical side walls for reasons which will become apparent from the discussion below.

A pair of identical bottom compression strips 27 also composed of a soft spongy resilient material like top compression strips 26, are interposed between a bottom portion of screen 12 and side wall 182 of bottom angle bracket 18.

Screen 12 as shown in FIG. 1 is rectangular in shape, has a lenticular lens portion 120, a fresnel lens portion (not shown in FIG. 1) and vertical edges 121. A plurality of holes 124 are formed in its top portion which cooperate with slots 184 and holes 260, which will be described below.

As can be seen in FIGS. 1-3, the frame 10 is assembled so that each of the side slots 146 of top brackets 14 and each of the holes 260 of the compression strips 26 are disposed in alignment with each of the respective holes 124 in screen 12. A top compression strip 26 is placed in a texture cavity formed in the lenticular lens side and in the fresnel lens side to provide an even gripping area along the entire width of the screen. A top bracket 14 is placed over each top compression strip 26 so that the top compressions strips 26 are interposed between screen 12 and top brackets 14.

A bolt 30, or other fastening element is inserted through each of the four aligned openings in frame assembly 10, each opening consisting of an aligned side slot 146 of a first top bracket 14, hole 260 of a first top compression strip 26, hole 124 of screen 12, hole 260 of a second top compression strip 26 and side slot 146 of a second top bracket 14. A washer 32 and a nut 34 tighten the bolt to secure the screen in place within top brackets 14 and 16. Although four corresponding slots 146, holes 260 and holes 124 are shown in the drawings, obviously greater or fewer slots and holes could be utilized as long as the function of securing the screen is achieved.

The bottom portion of screen 12 is not bolted as is the top portion. Bottom compression strips 27 are placed in texture cavities formed in the bottom portion of the screen on both the lenticular lens side and the fresnel lens side. As shown, each bottom compression strip 27 is interposed between bottom bracket 18 and screen 12, so that the outer surface of side wall 182 abuts the compression strip 27.

The side edges 121 of screen 12 are received in longitudinal channels 220 formed in U-shaped vertical supports 22. The channels extend along the entire length of supports 22.

Once the screen is mounted in the fashion described above, it can be seen that the frame 10 allows for both lateral and longitudinal adjustment of screen 12 to advantageously achieve proper alignment with the projector. Upper slots 144 of top brackets 14 allow for the frame assembly (and the attached screen 12) to be moved slightly laterally (forwardly or rearwardly) to a desired position. Bottom slots 184 of bottom angle brackets also accommodate such movement. Additionally, side slots 146 of top brackets 14 allow for movement of the frame assembly 10 (and attached screen 12) longitudinally (side to side). Bolt 30 is tightened once the screen 12 is in the desired position. Moreover, mounting of the screen 12 as described above, provides for securement of the top portion of screen 12 between compression strips 26 by use of bolt 30, and for non-rigid securement of the bottom portion of screen 12 since their are no bolts as the bottom portion is just sandwiched between the bottom compression strips 27 and bottom brackets 18. This advantageously prevents strains or stresses which could cause cracking of the screen. It allows the screen to expand and contract with climatic variations, without sacrificing alignment.

Figure 4:
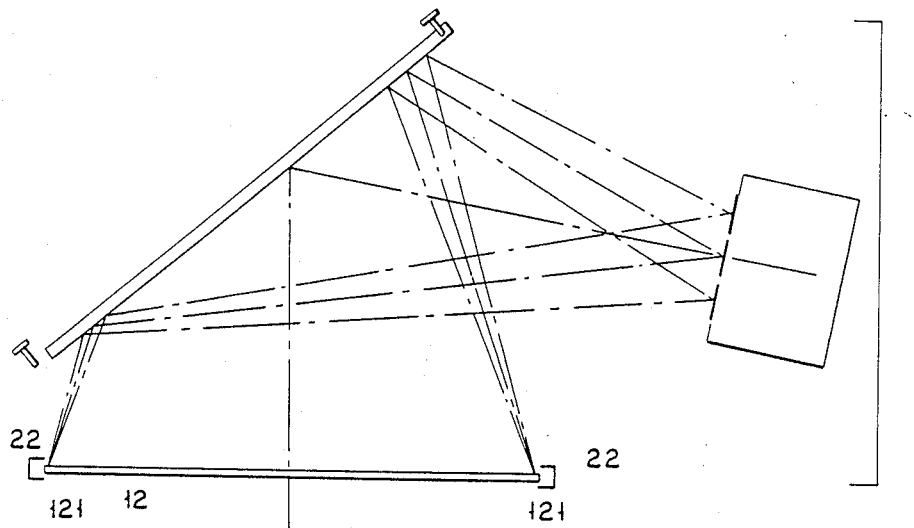
FIG. 4 is a top view showing a single screen mounted within the vertical supports of the present invention.

FIG. 4 shows the mounting of a single screen 12 within vertical supports 22. Side edges 121 are received within longitudinal channels of vertical supports 22.

Figure 1B:
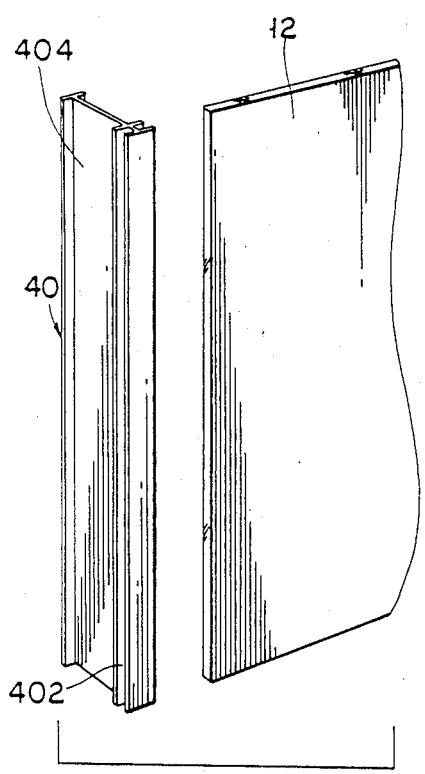
FIG. 1B is an enlarged exploded view showing a portion of the screen and the T-bar of the present invention used to mount contiguous screens.
Figure 5:
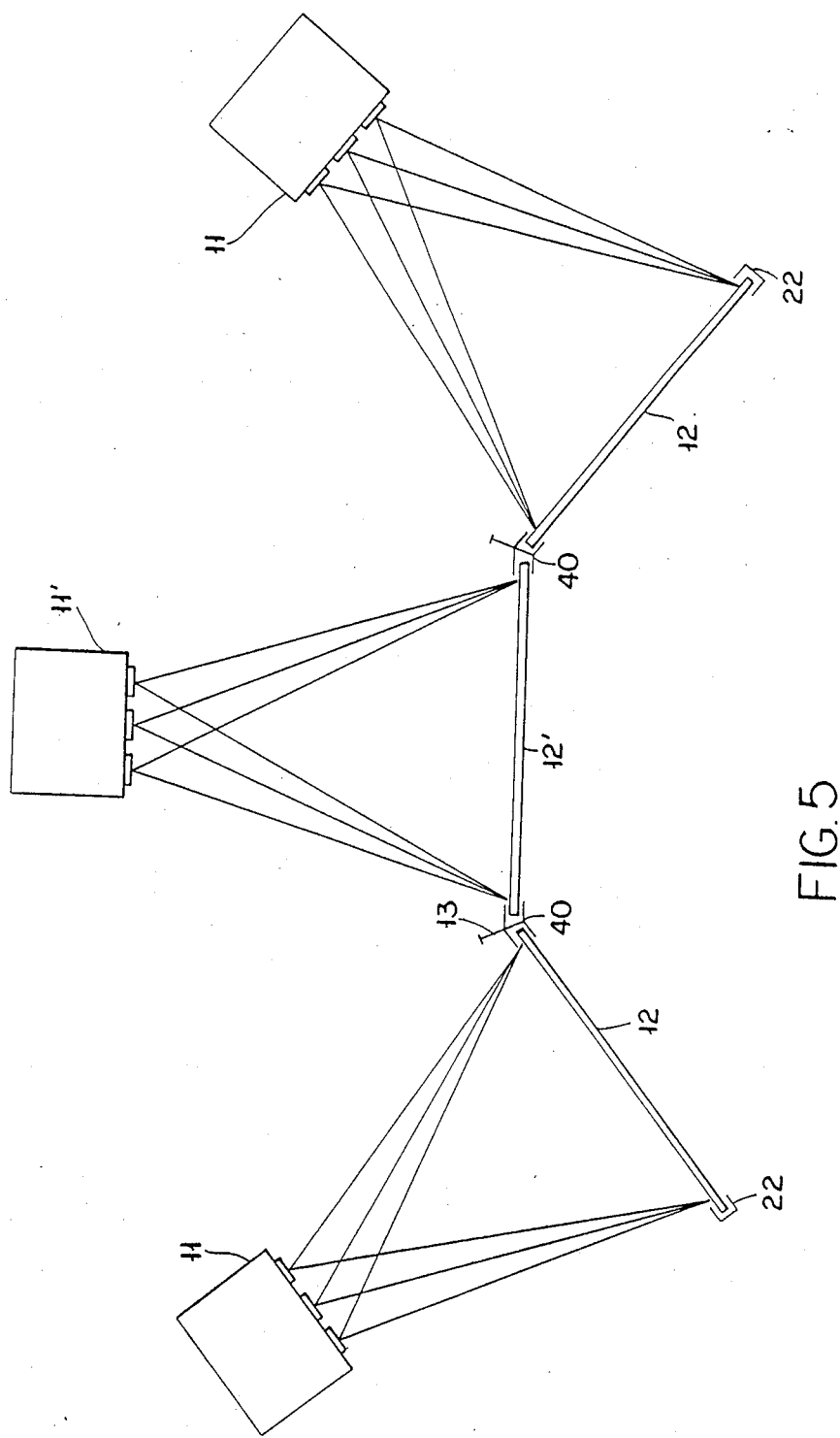
FIG. 5 is a top view showing three contiguous screens mounted within both the vertical supports and separators of the present invention.

FIGS. 1B and 5 show an alternate embodiment of vertical supports 22 used for mounting screens contiguously, designated by reference numeral 40. Support or separator 40 has a narrow channel 402 and a wide channel 404, extending along the length of support 40, formed on both of its side surfaces. Each channel 402 receives a vertical edge 121 of contiguous screens 12. FIG. 5 shows three contiguously mounted screens, wherein middle screen 12 has a support 40 mounted on each of its side edges to receive the vertical edges 121 of an outer screen 12. The outermost vertical edges of the outer screens 12 have vertical support 22 disposed thereon. Obviously, with the use of additional separators 40, additional screens can be placed in a contiguous arrangement. Fins 13 of separators 40 act as a light baffle to prevent light from center projector 11' from falling on screens 12.

Figure 6:
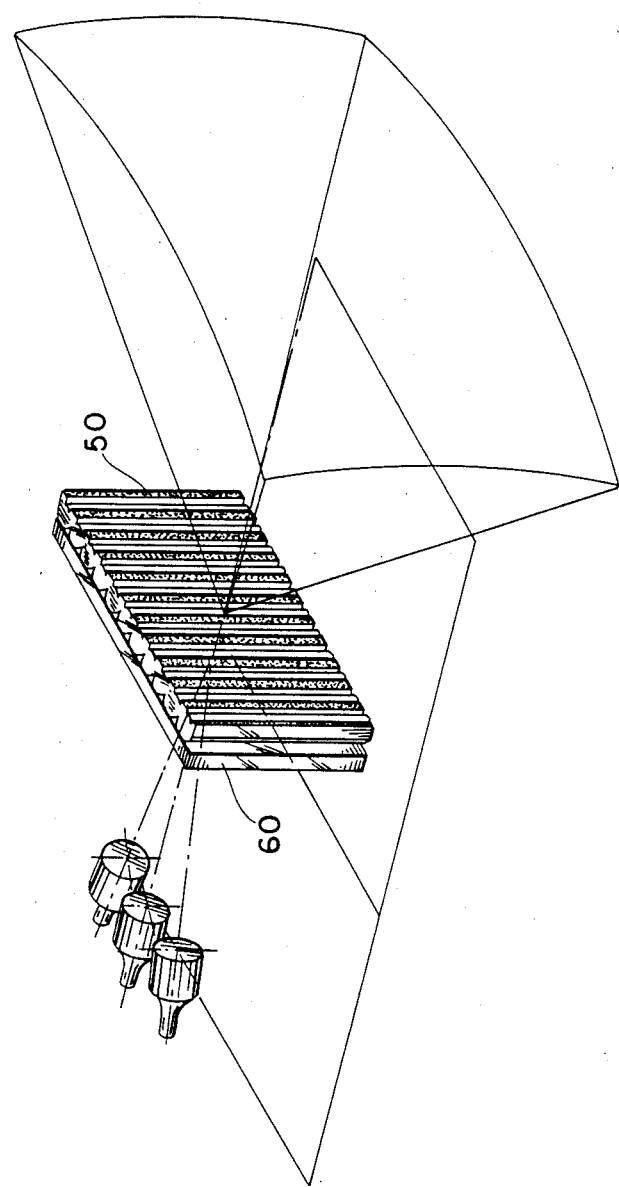
FIG. 6 is a front perspective view of a two piece optical screen.

Turning now to FIG. 6 which shows a two piece optical screen 12, reference numeral 60 designates the fresnel lens and reference numeral 50 designates the lenticular lens which has vertical black stripes, which faces the audience. Fresnel element 60 is mounted to lenticular element 50 as will be described in detail below. As is conventional, the lenticular element or front piece 50 is slightly shorter in length than fresnel element or rear piece 60.

Five embodiments for joining the front and rear pieces 50, 60 of the screen 5 are illustrated in FIGS. 7-11. Each of these embodiments advantageously allows the front piece 50 to hang from the rear piece 60 so gravity keeps the front piece 50 in place to prevent it from sliding down to rest on its bottom edge which causes buckling and separation.

In a first embodiment shown in FIG. 7, front piece 50 has a tongue 501 extending from a top portion of piece 50, below the top edge. A groove 601 formed in rear piece 60 receives tongue 501. Pieces 50, 60 are held together by adhesive or by taping the edges. The groove 601 and tongue 501 could extend along the entire width of front and rear pieces 50, 60 respectively, or alternately, a plurality of discrete cooperating tongues and grooves could be spaced apart along the width.

Figures 7, 8, 9, 10, 11:
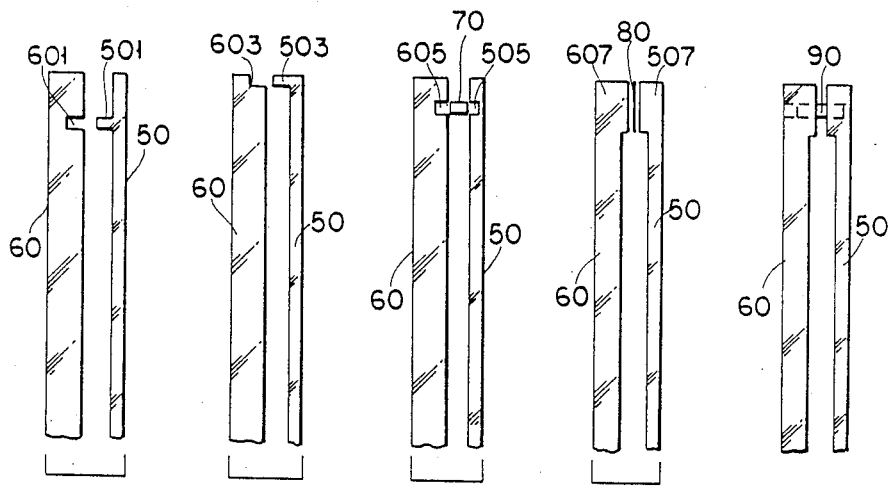
FIG. 7 is an exploded cross section view of the two piece screen showing a first embodiment of the mounting of the present invention.
FIG. 8 is an exploded cross-section exploded view of the two piece screen showing a second embodiment of the mounting of the present invention.
FIG. 9 is an exploded cross section view of the two piece screen showing a third embodiment of the mounting of the present invention.
FIG. 10 is an exploded cross section view of the two piece screen showing a fourth embodiment of the mounting of the present invention.
FIG. 11 is an exploded cross section view of the two piece screen showing a fifth embodiment of the mounting of the present invention.

In a second embodiment illustrated in FIG. 8, front piece 50 has a tongue 503 formed along its top edge and is received in a groove 603 formed along the top edge of rear piece 60. The two pieces 50, 60 are held together by adhesive of by taping the edges. As with the embodiment in FIG. 7, the tongue and groove can extend continuously along the width of the pieces 50, 60 or a series of discrete, spaced apart tongue and grooves could be provided.

In a third embodiment shown in FIG. 9, a groove 505 and 605 are formed in a top portion of front piece 50 and rear piece 60, respectively. The grooves are preferably formed below the top edge. A spline 70 is placed within grooves 505, 605 to join front piece 50 and rear piece 60 together, and the pieces 50, 60 are held together by adhesive or by taping the edges.

In a fourth embodiment shown in FIG. 10, both the front and rear piece 50, 60 have a widened top portion 507, 607, respectively. A flat piece 80 is molded along the top edge between the widened portions and held together by adhesive or solvent, and the edges can be taped if desired.

In a fifth embodiment illustrated in FIG. 11, instead of the flat piece 80 which is used in the embodiment of FIG. 10, a pin 90 is inserted through both front and rear pieces 50, 60. Adhesive or a solvent may be used if desired.

The construction of FIGS. 7-11 may be mounted by the arrangement shown in FIGS. 1-6.

It will be appreciated that the instant specification and claims are set forth by way of illustration and not limitation, and that various modifications, additions, or substitutions may be made without departing from the spirit and scope of the present invention.

What is claimed is:

1. A hanging device for hanging an optical rear projection screen comprising:
   means for securing a top portion of the screen;
   means for non-rigidly restraining a bottom portion of the screen;
   means for adjusting the screen in either a lateral or a longitudinal direction.

2. A hanging device as recited in claim 1, wherein said securing means comprises a pair of upper brackets and a fastening element, said pair of upper brackets each having at least one aperture and disposed on opposing sides of the screen to sandwich the top portion of the screen therebetween, said fastening element inserted through the screen and said at least one aperture.

3. A hanging device as recited in claim 1, wherein said restraining means comprises a pair of lower brackets disposed on opposing sides of the screen to sandwich the lower portion of the screen therebetween.

4. A hanging device as recited in claim 2, wherein each of said upper brackets has a top wall and said longitudinal adjusting means comprises a slot formed in said top wall.

5. A hanging device as recited in claim 2, wherein each of said upper brackets has a vertical wall, and said lateral adjusting means comprises a slot formed in each of said vertical walls.

6. A hanging device as recited in claim 2, further comprising a compression strip interposed between each of said upper brackets and the top portion of the screen to allow for expansion and contraction of the screen responsive to temperature changes.

7. A hanging device as recited in claim 6, wherein each of said compression strips has a plurality of holes disposed in alignment with said slots of said top bracket to receive a fastening member.

8. A hanging device as recited in claim 1, further comprising a vertical piece having a channel formed therein to receive a vertical edge of the screen.

9. A hanging device as recited in claim 8, wherein said vertical piece has an outer channel and an inner channel oppositely disposed to one another, said outer channel receives a vertical edge of another screen to provide a contiguous arrangement of the two screens.

10. A hanging device as recited in claim 3, further comprising a bottom compression strip interposed between each of said bottom brackets and the bottom portion of the screen to allow front expansion and contraction of the screen responsive to temperature changes.

11. A hanging device for hanging a rear projection screen comprising first and second upper brackets disposed on opposing sides of a top portion of the screen, each of said upper brackets having an aperture formed therein to receive a fastening element to secure the top portion of the screen; first and second lower brackets disposed on opposing sides of a bottom portion of the screen to sandwich the screen therebetween to restrain forward and rearward movement of the bottom portion of the screen a compression strip interposed between each of said brackets and the screen to allow expansion and contraction of the screen.

12. An apparatus as recited in claim 11, further comprising first and second vertical supports having a longitudinal channel formed therein to receive a vertical edge of the screen.

13. An apparatus comprising means for holding and separating contiguously mounted optical rear projection screens, said apparatus comprising a vertical support having an outer and inner longitudinally extending channel formed therein, said outer and inner channels formed on opposing surfaces of said vertical support, said vertical support comprising a fin to prevent light designed to fall on one screen from falling on a contiguous screen.

14. A two piece optical rear projection screen comprising means for joining a front lenticular lens piece to a longer rear fresnel lens piece of the two piece optical rear projection screen, said front and rear pieces each having a front and rear surface, said joining means comprising means for hanging a top portion of said rear surface of said front piece from a top portion of said front surface of said rear piece to allow the weight of said front piece to hold it flat against said rear piece, said hanging means preventing downward sliding of said front piece.

15. A screen as recited in claim 14, wherein said hanging means comprises a groove formed in said top portion of said front surface of said rear piece and a tongue extending from said rear surface of said top portion of said front piece, said groove receiving said tongue to join said front piece to said rear piece.

16. A screen as recited in claim 15, wherein said groove and tongue are each formed along the top edge of said front and rear pieces.

17. A screen as recited in claim 15, wherein said groove and tongue are formed along the entire width of said rear piece and front piece, respectively.

18. A screen as recited in claim 14, wherein said hanging means comprises a plurality of grooves formed along said front surface of said top portion of said rear piece to receive a plurality of cooperating tongues extending outwardly from a rear surface of said top portion of said front piece.

19. A screen as recited in claim 14, wherein said hanging means comprises a spline, a groove formed in said rear surface of said front piece and a groove formed in said front surface of said rear piece, said spline extending into said grooves.

20. A screen as recited in claim 14, wherein said hanging means comprises a flat vertical piece disposed between said rear surface of said front piece and said front surface of said rear piece, said front and rear pieces adhesively secured to said flat piece.

21. A screen as recited in claim 14, wherein said hanging means comprises at least one pin inserted through said top portion of said front and rear pieces.

* * * * *